United States Patent
Meyer

(10) Patent No.: US 11,809,374 B1
(45) Date of Patent: *Nov. 7, 2023

(54) SYSTEMS AND METHODS FOR AUTOMATICALLY ORGANIZING FILES AND FOLDERS

(71) Applicant: Google LLC, Mountain View, CA (US)

(72) Inventor: Cayden Meyer, Pyrmont (AU)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/379,900

(22) Filed: Jul. 19, 2021

Related U.S. Application Data

(63) Continuation of application No. 15/798,364, filed on Oct. 30, 2017, now Pat. No. 11,068,442, which is a continuation of application No. 14/338,117, filed on Jul. 22, 2014, now Pat. No. 9,805,042.

(51) Int. Cl.
| | |
|---|---|
| *G06F 16/10* | (2019.01) |
| *G06F 16/30* | (2019.01) |
| *G06F 16/16* | (2019.01) |
| *G06F 16/35* | (2019.01) |

(52) U.S. Cl.
CPC ............ *G06F 16/16* (2019.01); *G06F 16/358* (2019.01)

(58) Field of Classification Search
CPC ................................ G06F 16/16; G06F 16/358
See application file for complete search history.

(56) References Cited

U.S. PATENT DOCUMENTS

| | | | |
|---|---|---|---|
| 7,765,212 B2 | 7/2010 | Surendran et al. | |
| 7,945,600 B1 | 5/2011 | Thomas et al. | |
| 8,473,532 B1 | 6/2013 | Ben | |
| 9,286,304 B2 | 3/2016 | Taljanovic | |
| 2005/0044487 A1 | 2/2005 | Bellegarda et al. | |
| 2009/0248615 A1 | 10/2009 | Drory et al. | |
| 2014/0164535 A1 | 6/2014 | Lynch | |
| 2015/0373118 A1* | 12/2015 | Ganesan | G06F 3/1268 709/219 |

* cited by examiner

*Primary Examiner* — Kristopher Andersen
(74) *Attorney, Agent, or Firm* — Lowenstein Sandler LLP

(57) ABSTRACT

Systems and methods are disclosed herein for organizing a plurality of files to be stored on a cloud file system. A method includes identifying a file to be stored on the cloud file system, identifying features of the file, wherein the features of the file include at least three selected from a group comprising file content, keywords in the file, file name, time of creation of the file, time of modification of the file, type of the file, a set of users associated with the file, folder depth of the file, and an origination of the file, identifying a plurality of folders each including a subset of the plurality of files, wherein grouping the plurality of files into respective folders is based on assessed similarities across each subset of the plurality of files, assessing similarities between the file and each subset of the plurality of files based on the features of the file and features of each subset of the plurality of files, determining, based on the assessed similarities between the file and each subset of the plurality of files, whether any of the plurality of folders satisfies one or more destination folder criteria, and responsive to determining that none of the plurality of folders satisfies the one or more destination folder criteria, creating a new folder as a destination folder for the file to be stored on the cloud file system.

18 Claims, 7 Drawing Sheets

| FILE ID | SIZE | FILE TYPE | ORIGIN | SENDER OF EMAIL | FILE OWNER | SHARED WITH |
|---|---|---|---|---|---|---|
| 154 | 1.8 MB | TEXT | EMAIL ID 423 | USER A | USER A | USERS B, C, D |
| 1857 | 0.6 MB | SPREADSHEET | EMAIL ID 423 | USER A | USER A | USERS B, C, D |
| 675 | 4.9 MB | TEXT | LOCAL FILE SYSTEM | N/A | USER C | N/A |
| 2435 | 1.2 MB | IMAGE | LOCAL FILE SYSTEM | N/A | USER C | N/A |
| 931 | 2.4 MB | TEXT | EMAIL ID 695 | USER B | USER D | USER B |
| 1526 | 2.3 MB | IMAGE | EMAIL ID 189 | USER B | USER D | USER B |

FIG. 2

| SIMILARITY SCORES | 154 | 1857 | 675 | 2435 | 931 | 1526 |
|---|---|---|---|---|---|---|
| 154 | 1 | 0.9 | 0.2 | 0.1 | 0.4 | 0.3 |
| 1857 | X | 1 | 0.1 | 0.1 | 0.3 | 0.3 |
| 675 | X | X | 1 | 0.4 | 0.1 | 0.1 |
| 2435 | X | X | X | 1 | 0.1 | 0.1 |
| 931 | X | X | X | X | 1 | 0.8 |
| 1526 | X | X | X | X | X | 1 |

SYSTEMS AND METHODS FOR AUTOMATICALLY ORGANIZING FILES AND FOLDERS

CROSS-REFERENCE TO RELATED APPLICATIONS

This application is a continuation application of co-pending U.S. patent application Ser. No. 15/798,364, filed Oct. 30, 2017, which is a continuation application of U.S. patent application Ser. No. 14/338,117, filed Jul. 22, 2014, now U.S. Pat. No. 9,805,042, which is herein incorporated by reference.

FIELD OF THE INVENTION

In general, this disclosure relates to data storage, in particular, to systems and methods for organizing files and folders on a cloud system.

BACKGROUND

Methods for automatically sorting files use fixed templates and are used for certain types of files that are straightforward to organize. For example, music players may use artist, album, and genre to automatically organize music files. In another example, TV shows and movies may be organized according to genres. However, existing systems only are capable of doing organization for certain types of content, and require explicit metadata regarding the item, such as its name or tags in the file itself.

SUMMARY

Systems and methods are disclosed herein for organizing a plurality of files on a cloud file system. A processor identifies the plurality of files on the cloud file system, and identifies features of the plurality of files, wherein the features of a file in the plurality of files include at least three selected from the group comprising file content, keywords in the file, file name, time of creation of the file, time of modification of the file, type of the file, a set of users with whom the file is shared over the cloud file system, folder depth of the file, and an origination of the file. The processor clusters the plurality of files into a plurality of groups, each group including a subset of the plurality of files, wherein the clustering is based on assessed similarity scores across each subset of the plurality of files, and outputs an indication of the clustering to a user associated with the plurality of files.

Another aspect relates to a system including means for organizing a plurality of files on a cloud file system. The system includes means for identifying the plurality of files on the cloud file system, and means for identifying features of the plurality of files, wherein the features of a file in the plurality of files include at least three selected from the group comprising file content, keywords in the file, file name, time of creation of the file, time of modification of the file, type of the file, a set of users with whom the file is shared over the cloud file system, folder depth of the file, and an origination of the file. The system also includes means for clustering the plurality of files into a plurality of groups, each group including a subset of the plurality of files, wherein the clustering is based on assessed similarity scores across each subset of the plurality of files, and means for outputting an indication of the clustering to a user associated with the plurality of files.

In some embodiments, the system further includes means for receiving a user input from the user indicative of a request to add an additional file to the plurality of files on the cloud file system. The additional file may be an attachment file corresponding to an email attachment to the plurality of files on the cloud file system. The system may further include means for selecting a folder on the cloud file system based on one or more assessed similarity scores between the attachment file and one or more files in the folder. The features may further include at least two selected from the group comprising: a sender of the email, one or more recipients of the email, content of the email, an indication of whether the email is personal, an indication of whether the email is business, a number of attachment files in the email, and one or more folder destinations on the cloud file system of the one or more other attachment files in the email.

In some embodiments, the request is to add the additional file to a requested folder on the cloud file system. The system may further include means for selecting a suggested folder on the cloud file system based on one or more assessed similarity scores between the additional file and one or more files in the suggested folder, and means for comparing the requested folder to the suggested folder. The system may include means for repeating the receiving, selecting, and comparing steps a number times, and in response to determining that a number of times that the requested folder matches the suggested folder exceeds a predetermined percentage of the number of times, means for providing a recommendation to the user to add the additional file to the suggested folder, and means for determining whether the user accepts the recommendation.

In some embodiments, the means for clustering is in response to determining that a number of files in the plurality of files exceeds a threshold and that the plurality of files are in a same folder on the cloud file system. The system may further include means for creating a folder on the cloud file system for each group in the plurality of groups, and means for sorting each file in the plurality of files into a corresponding folder on the cloud file system. The origination of the file may indicate whether the file is an attachment to an email or a file stored on a local file system.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 2 is an example data structure stored on a database that includes data related to files that are stored on a web-based storage system, according to an illustrative embodiment.

FIG. 3 is an example data structure stored on a database that includes data related to similarity scores between files stored on a web-based storage system, according to an illustrative embodiment.

DETAILED DESCRIPTION

To provide an overall understanding of the disclosure, certain illustrative embodiments will now be described, including a system for automatically organizing files on a cloud file system. In particular, a device is described that allows for automatic organization of files, and for automatic suggestion of a folder as a destination for a particular file. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The present disclosure provides systems and methods for automatically organizing a set of files into folders on a cloud system such as a web-based storage system. As used herein, a cloud system refers to a system that is implemented in the cloud, and may be used for storage of files. The cloud system may be referred to herein as a cloud file system or a system that uses cloud storage to store one or more files. The systems and methods described herein allow for a set of user files on a web-based storage system to be clustered according to a set of similarity scores assessed between each pair of user files. Moreover, when a request is received for saving a particular file to the web-based storage system, the present disclosure provides a recommended folder destination for the particular file. The systems and methods of the present disclosure are described herein in terms of a web-based storage system, which may communicate with other systems over a network to store and share user data. In general, one of ordinary skill in the art will understand that the systems and methods described herein are applicable to systems that are locally interconnected without departing from the scope thereof. For example, the present disclosure is described in terms of providing suggestions for organizing files stored on a cloud file system. However, in general, one of ordinary skill in the art will understand that the systems and methods described herein are also applicable to providing suggestions for organizing files stored on a local device, without departing from the scope of the present disclosure.

Figure 1:
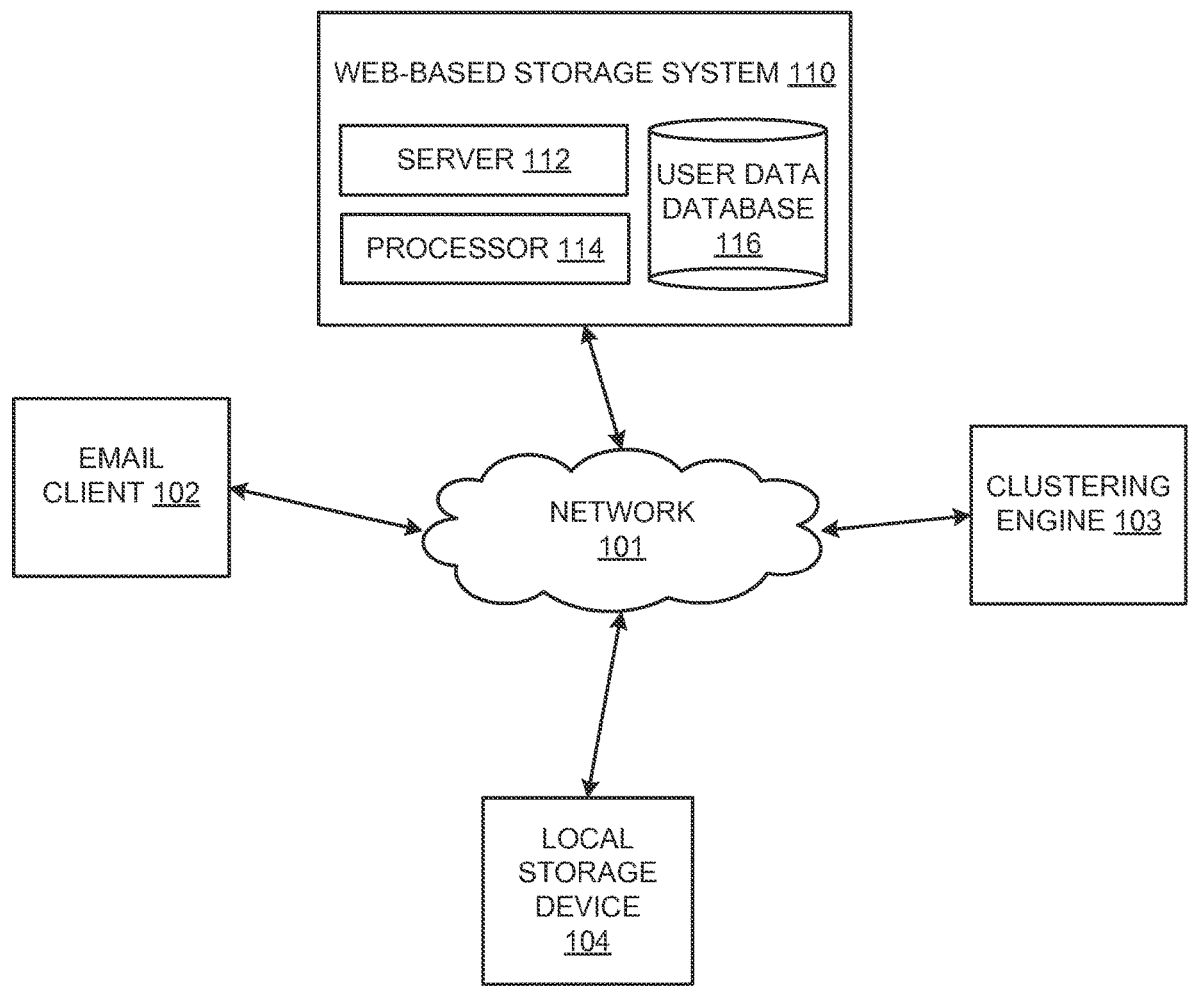
FIG. 1 is a block diagram of a computerized system for organizing a set of files on a web-based storage system, according to an illustrative embodiment.

FIG. 1 depicts an example of a network and database structure that may be used to implement the systems and methods herein. FIG. 1 is a block diagram of a computerized system 100 for organizing a set of files on a web-based storage system. The system 100 includes a web-based storage system 110, a local storage device 104, a clustering engine 103, and an email client 102, all configured to communicate over a network 101. The local storage device 104 may include a user files database that stores files and provides a user with access to the email client 102 over a user interface having a display and a user input device. The web-based storage system 110 includes a server 112, a processor 114, and a user data database 116. The web-based storage system 110 is a file hosting system that allow users to store and retrieve data accessible from one or more user devices such as the local storage device 104. These storage systems may use cloud storage to store user data.

Optionally, the user data database 116 also stores metadata related to these user files. The clustering engine 103 is configured to communicate with the web-based storage system 110 to allow the clustering engine 103 to have access to user data and/or metadata associated with the user data that is stored on the web-based storage system 110, such as in a user data database 116. The clustering engine 103 may have the form of a machine learning system, a machine learning classifier, or any other suitable system for clustering and organizing a set of files. The machine learning system may involve Bayesian statistics, neural networks, support vector machine models, or any other suitable type of machine learning technique. The clustering engine 103 may implement a machine learning technique to define a set of rules for assessing similarity scores between a pair of files and for organizing files into groups. In particular, the clustering engine 103 processes the user data on the web-based storage system 110 to obtain a recommended way to organize a set of files into a set of folders based on the characteristics of those files. The recommended way may be provided to a user, who may select to accept or reject the recommendation to organize the files stored on the user data database 116.

The clustering engine 103 may additionally have access to the email client 102. In particular, the clustering engine 103 may be configured to organize files in the email client 102. For example, the clustering engine 103 may apply the set of rules to a set of attachments in one or more emails received by a user to identify a recommended destination for each attachment. The user's email account may be linked to the web-based storage system 110, such that the clustering engine 103 may identify suitable email attachments in the email client 102 for uploading from the email client 102 to the user data database 116 in the web-based storage system 110. Moreover, the clustering engine 103 may further provide a recommendation for a suitable folder destination in the user data database 116 for one or more email attachments, or the clustering engine 103 may provide a recommendation to create a new folder on the user data database 116 for storing the one or more email attachments. In some implementations, the email client, web-based storage system 110, and clustering engine 103 are implemented by the same server or different servers.

As used herein, the term "processor" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. Only one web-based storage system 110, one local storage device 104, one clustering engine 103, and one email client 102 are shown in FIG. 1 to avoid complicating the drawing. In general, the system 100 can support multiple web-based storage systems, local storage devices, clustering engines, and email clients.

The web-based storage system 110 is a file hosting system that allows users to store, retrieve, and modify data. This data may be referred to as a user's web data, which is stored in the user data database 116. The server 112, the processor 114, or both may perform functions related to maintaining the user data database 116, such as allocating memory for the data, receiving new data to be stored in the database, deleting data in the database, providing indications of how much storage space is available in the database, or any other suitable function related to database maintenance. The web-based storage system 110 may be stored on a single server system or in a distributed system. In particular, the web-based storage system 110 may use cloud storage to store user data. In some embodiments, the web-based storage system 110 allows a user to share one or more files that the user "owns" with other users. In particular, the user may set permissions to the file that allow other users to view or edit the file. Moreover, sharing a file with another user may cause that file to be associated with the other user's account such that when the other user logs into the web-based storage system 110, the shared file appears in a list of files associated with the other user.

It may be desirable to a user to sort some or all of the user files stored on the web-based storage system 110 into an organized set of folders. In particular, users tend to dump files in the root directory, and forget about the files until they need them. In one embodiment, the clustering engine 103 may receive as input a set of files that are stored on a user's database, and may provide as output recommended way to organize the set of files. In particular, the recommended organization may include one or more folders for storing each file in the set of files. In another embodiment, the clustering engine 103 may receive as input a file that is associated with the user's email account. In this example, the file may be an attachment to an email, and the clustering engine 103 communicates with the email client 102 to identify the file and various characteristics of the file. Based on the file's characteristics, the clustering engine 103 may be configured to recommend a folder destination on the web-based storage system 110 for storing the file, where the folder destination may correspond to an existing folder or a new folder to be created. Moreover, the clustering engine 103 may receive multiple files corresponding to attachments from the same or different emails, and provide a recommended folder destination for each file.

The user accesses the email client 102 and the web-based storage system 110 over the local storage device 104, which may be a personal computer device. The user of the local storage device 104 may have access to other personal devices such as other personal computers, laptops, mobile devices, or tablets that are also capable of communicating with the web-based storage system 110 over the network 101. In this case, it may be desirable to allow the user to use multiple devices that have access to the same set of files that are stored on the web-based storage system 110.

After identifying the set of files for organizing in the web-based storage system 110, the clustering engine 103 assigns a set of similarity scores to each file in the set of files. In particular, the set of similarity scores corresponds to a value or number that is indicative of how similar each file in the set of files is to another file. The other file may correspond to another file in the set of files, or a file that is already organized and stored in a folder on the web-based storage system 110. The similarity scores are used to cluster the set of files into different groups or folder destinations, or to recommend a folder destination for each file in the set of files.

In one example, the user receives an attachment in an email that corresponds to a receipt. The clustering engine 103 may detect that a receipt has been received in an email, and may provide a suggestion to the user to save the attachment file to the web-based storage system 110, so that the user may access the file via the system 110 and not just via the email client 102. Moreover, the suggestion may include a recommended folder destination on the web-based storage system 110 for storing the receipt.

In another example, the clustering engine 103 monitors the folder destinations of files when the user uploads files from the local storage device 104 or the email client 102 to the web-based storage system 110. In particular, as is described in detail in relation to FIG. 6, the clustering engine 103 may monitor the user's activity in the background for a training period of time, without providing any suggestions. During the training period, the clustering engine may determine predictions of folder destinations for where certain files may be stored, without providing any output to the user. The clustering engine 103 may then determine whether the predictions sufficiently match the actual destinations of the files. If not, the clustering engine 103 may update the parameters of a predictive model used to select the folder destinations and repeat this process, until the predictions sufficiently match the actual destinations. Once the predictions sufficiently match the actual destinations, the clustering engine 103 may begin to provide suggestions for folder destinations for additional files.

In another example, the user may have a set of miscellaneous files on the root directory of the web-based storage system 110. In this case, the user may provide a user input indicative of a desire to see what an automatic organizational tool would recommend for organizing the set of miscellaneous files. Alternatively, the clustering engine 103 may detect the set of miscellaneous files in the same root directory, and may automatically provide suggestions for how to organize the files. To do this, the clustering engine 103 may assess similarity scores between each pair of the miscellaneous files to determine which of the miscellaneous files should be stored together, thereby forming groups of files. Similarity scores may also be assessed between each of the miscellaneous files and one or more files that are already stored in organized folders on the web-based storage system 110. Groups of files may be formed by applying a threshold to the similarity scores, such that a file is recommended to be stored with another file if they have a similarity score above some threshold.

Moreover, one or more criteria may be applied to the groups of files, such as a minimum tolerable similarity score between each pair of files in a group of files. The clustering engine 103 may determine whether any of the identified groups of files should be stored with an existing folder on the web-based storage system 110. To do this, the clustering engine 103 may assess additional similarity scores, between files in the miscellaneous group of files (such as files that were originally stored in the root directory, for example) and files that are already organized into folders on the web-based storage system 110. If the clustering engine 103 determines that a group of files should be stored with an existing folder, the clustering engine 103 may recommend storing the group with the existing folder. Otherwise, the clustering engine 103 may recommend creating a new folder for the group. In some embodiments, the new folder is a subfolder in an existing folder on the system.

The clustering engine 103 assesses similarity scores based on metadata associated with the user files. In particular, the metadata includes data that characterizes user files stored on the user data database 115 or that are attached to an email in the email client 102. An example data structure that includes some example forms of metadata is shown and described in relation to FIG. 2. In particular, the metadata may include a size of the file, a type of the file, an origin of the file, an owner of the file. When the file is an attachment to an email, the metadata may further include information regarding the email, such as the sender of the email or the email content. When the file is already stored on the web-based storage system 110, the metadata may further include an indication of whether the file is already shared with one or more other users, and the user identifiers associated with the other users. The example metadata described herein are shown for illustrative purposes only, and any suitable feature of a file may be used without departing from the scope of the present disclosure. The metadata is used by the clustering engine 103 to assign similarity scores to pairs of files for storing in the web-based storage system 110.

The clustering engine 103 may apply statistical modeling methods to fit a predictive model that may be used to predict which features of a file are important in determining which folder to store the file in. For example, the predictive model may define relative weights applied to the features of a file for assessing similarity scores. The predictive model includes the set of rules that define how certain features of a file, such as its metadata, are predicted to affect the storing of the file. The clustering engine 103 may initially operate in the background, without showing recommendations to the user. In this case, the clustering engine 103 may form predictions of where a user may store a particular file, and determine whether the prediction matches where the user actually stores the file. If the predicted folder matches the actual folder, the predictive model has performed well. However, after several iterations, if there are substantial differences between the predicted folders and the actual folders, one or more parameters of the predictive model may be updated, and the updated predictions may be compared to the actual folders. These steps are repeated until the performance of the predictive model satisfies one or more criteria, such as exceeding a threshold. After an adequate predictive model is reached, the clustering engine 103 then applies the final predictive model to form recommendations to the user.

In some embodiments, after the clustering engine 103 has generated a final resulting predictive model, the clustering engine 103 periodically updates the predictive model. In particular, the clustering engine 103 may periodically perform the machine learning training technique on user files in the web-based storage system 110. The update may be performed any time the user files stored on the web-based storage system 110 change, such as any time the files are added, replaced, deleted, or modified. Alternatively, the update may be performed once in a pre-specified length of time, such as once a day, a week, a month, or any other suitable period of time.

In some embodiments, the clustering engine 103 is configured to perform the machine learning training technique based on different sets of user files for different users or subsets of users. In general, there may not be enough data on the web-based storage system 110 to derive a different predictive model for each user. However, by grouping similar users together, the performance of the predictive models may be improved compared to having a single predictive model for all users of the web-based storage system 110. In this case, the clustering engine 103 separates the set of user files that are stored on the web-based storage system 110 into subsets of user files. Each subset of user files corresponds to a subset of users associated with the web-based storage system 110. The machine learning training technique is performed separately on each subset of user files, such that multiple predictive models (i.e., one for each subset of user files) are generated. This may be desirable when the different users have different ways of organizing their files or have different types of files. For example, the clustering engine 103 may recognize that a first subset of users stores many more text files than video files on the web-based storage system 110, and a second subset of users stores many more video files than text files. In this case, the clustering engine 103 may recognize that these different subsets of users have different ways of organizing their user files, such that the subsets of users should be treated differently in the file organization process.

In some embodiments, a clustering algorithm may be performed on the aggregate set of users to form clusters of subsets of users based on the types of files that the users store, or any other characteristic associated with the users. In an example, the users may be sorted into different subsets of users based on whether the users are new users of the web-based storage system 110. In particular, new users may not have an existing folder system but may have a set of miscellaneous files stored in their root directories. Other users may have existing folder systems. The recommendations for such users are different in that the clustering engine 103 would recommend the creation of a new folder system for the new users, while it may be desirable to adhere to the existing system that the other users have. In this manner, the new users may be treated differently from the other users. In particular, the web-based storage system 110 contains less information on the new users than on the old users. In this case, it may be desirable to apply different predictive models for the new users compared to the old users. In particular, a default generic predictive model may be initially applied to the new users, until the web-based storage system 110 collects enough information regarding the user to appropriately assign the user to a subset of users.

In general, any number of subsets of users may be separated and have different predictive models applied to their user files. However, one of ordinary skill in the art will recognize that there is a tradeoff between performance of the predictive model and the size of the training data set. In particular, if the users are separated into too many subsets, there may be too little user data available on the web-based storage system 110 to train a predictive model that has the desired accuracy in predictive power. In an extreme example, training may be attempted on the user files on the web-based storage system 110 that are associated with a single user. However, if that user only uses the web-based storage system 110 to back up a small number of his user files that are relatively unorganized. In that case, the predictive model generated by the clustering engine 103 may perform poorly because little training data is available. In contrast, a predictive model may perform well if it was trained on another single user who stores all of his user files on the web-based storage system 110 and maintains a folder system for storing his files. In this manner, the performance of the predictive model may be dependent on the amount of user data available to train the predictive model, and the training data sets may be separated according to users who have different characteristics, such as users who have different types of user files stored on the web-based storage system 110.

As shown in FIG. 1 the clustering engine 103 and email client 102 are separate devices from the web-based storage system 110 and local storage device 104. However, one of ordinary skill in the art will understand that one or both of the email client 102 and the clustering engine 103 may be stored on the same device as the web-based storage system 110 or the local storage device 104. In particular, because the clustering engine 103 may access the user data that is stored on the user data database 116, it may be desirable for the clustering engine 103 to be stored on the same device as the web-based storage system 110. In this case, the clustering engine 103 may access the user data from the user data database 116 without having to communicate through the network 101. Moreover, the email client 102 and the web-based storage system 110 may be stored on the same device. In general, the clustering engine 103 and the email client 102 may be stored on the same device or on different devices, which may be on the same device as the web-based storage system 110, the local storage device 104, or a separate device.

The local storage device 104 may include input/output (I/O) ports, a processor, a memory, a user interface, and a network interface, all connected over a data bus. The user at the local storage device 104 may interact with the local storage device 104 over the user interface, which may include a display unit and a user input unit. For example, the user interface may include a keyboard and/or a mouse that allows the user to select certain files for organizing. The user may select all the user files stored in the user data database 116, or a subset thereof. After the files are selected, clustering engine 103 applies a predictive model onto the selected files to organize the selected files into suitable groups for storing. The network interface on the local storage device 104 provides for communication with the network 101, and files in the user data database 116 are organized accordingly on the web-based storage system 110. The I/O ports on the local storage device 104 may include ports for a user to connect an external device to the local storage device 104. The user may then select, via the user interface, to upload and organize files from the external device to the web-based storage system 110. In an example, the external device may be a USB storage device or any other suitable device that may store user files.

The processor on the local storage device may be configured to perform any of the functions described herein as being performed by the local storage device 104 or the clustering engine 103. In an example, the processor may communicate with the web-based storage system 110 to perform a machine learning technique on the data that is stored in the user data database 116 to define a set of rules for organizing files that are to be stored or to be stored on the web-based storage system 110. Moreover, the processor may be configured to apply the set of rules to the files to define the groups of files. Memory on the local storage device 104 may store instructions readable by the processor on the local storage device 104 to carry out the processes described herein. In general, any storage device that is connected to the network 101 may be used as the local storage device, such as personal computers, laptops, work stations, tablets, and mobile devices.

FIG. 2 is an example data structure 200 that is stored on the web-based storage system 110. As an example, data structure 200 is stored on the user data database 116, which stores files as well as features of those files. The data structure 200 includes a list of six files, each having a file identifier. The file identifier may be a unique string of letters, numbers, or both that are assigned to each file. For each file, the data structure 200 has a field entry for the size of the file, a type of the file, an origin of the file, a sender of an email associated with the file (if any), an owner of the file, and who the file is shared with (if any).

As shown in FIG. 2, file 154 has size 1.8 megabytes, is a text file, was an attachment to an email with the email identifier 423 and sent by user A, is owned by user A, and is shared with users B, C, and D. File 1857 has size 0.6 megabytes, is a spreadsheet file, was an attachment to the email 423 and sent by user A, is owned by user A, and is shared with users B, C, and D. Furthermore, file 2435 has size 1.2 megabytes, is an image file, originated from a local file system, is not associated with an email, is owned by user C, and is shared with no other user. The data structure 200 indicates that files 154 and 1857 were sent as attachments to the same email from the same user, is owned by the same user A, and is shared with the same set of users B, C, and D. Thus, if the predictive model generated by the clustering engine 103 indicates that origin, sender, file owner, and shared users are important characteristics in predicting the manner in which the user would want the files to be stored, then the clustering engine 103 may assign files 154 and 1857 to the same group, and file 2435 to a different group.

The predictive model that is trained and applied by the clustering engine 103 is based on metadata associated with a file. Importantly, the predictive model is not based on any single feature. Instead, the predictive model is based on a combination of multiple features of user files, and various combinations of the features cause the predictive model to assign the files to various groups. The metadata shown in the data structure 200 is shown as an example only, and one of ordinary skill will understand that any other suitable metadata that describes a characteristic of the file may be used in addition to or in replacement of any of the metadata shown in the data structure 200.

FIG. 3 is an example data structure 300 that is generated and used by the clustering engine 103. The data structure 300 includes a six-by-six grid, where each row corresponds to one of the six files in the data structure 200, and each column corresponds to one of the six files in the data structure 200. The elements within the grid correspond to similarity scores assessed between the file indicated by the row and the file indicated by the column. As is shown in FIG. 3, the similarity scores may range from 0 to 1, where a 1 is assessed if the two files are the same file or at least have the same features that are used to assess the similarity score. Thus, the similarity score along the diagonal of the data structure 300 is one. Moreover, files that are similar to each other (such as files 154 and 1857, which originated from the same email, are owned by the same user, and are shared with the same set of users) are assessed similarity scores near 1. In contrast, a minimum score of 0 may be assessed if none of the features of the two files are similar. For example, files that are very different from each other (such as files 154 and 2435, which are different types, originated from different locations, are owned by different users, and are not shared with any of the same users) are assessed similarity scores near 0.

The similarity score is an output of the predictive model that represents a relative similarity between two files. In an example, the score may be based on a weighted sum of the metadata characteristics, where the weights are assigned in accordance with the predictive model, and the metadata characteristics are quantized into categories. For example, each metadata characteristic of a pair of files may be sorted into one of two categories—similar or not similar. Other categories may be used, such as slightly similar, very similar, not similar at all, or any other suitable category. Different sets of categories may be used for different metadata characteristics. For example, when the features are the same, such as two files originating from the same email, the metadata characteristic corresponding to file origin may be categorized as "very similar." If the two files originate from different emails from the same sender, the metadata characteristic corresponding to file origin may be categorized as "similar." If one file originates from an email and the other file originates from the local system, the metadata characteristic corresponding to file origin may be categorized as "not similar." In another example, the categories of the metadata characteristic corresponding to with whom the file is shared may be based on whether there is no overlap between the two sets of users with whom the two files are shared, whether there is a little overlap, whether there is substantial overlap, or whether the two sets of users are the same. As is shown in FIG. 3, the score ranges on a scale between 0 and 1, but in general, the score may range on any numeric scale, or may include a letter grade, without departing from the scope of the present disclosure.

In some embodiments, the predictive model provides relative weights that are assigned to the metadata features, and the weight is indicative of a predictive quality or predictive strength of each feature. For example, some features, such as the origin of the file, the owner of the file, and the set of users with whom the file is shared, may have higher weights than other features, such as the file size or the file type. In particular, the user may be predicted to group files that originated from the same email and that are shared with the same set of users together in the same folder, rather than simply grouping all files of the same type together in the same folder. In general, different metadata may be assigned different weights, and the similarity scores are assessed based on the weights.

Figure 4:
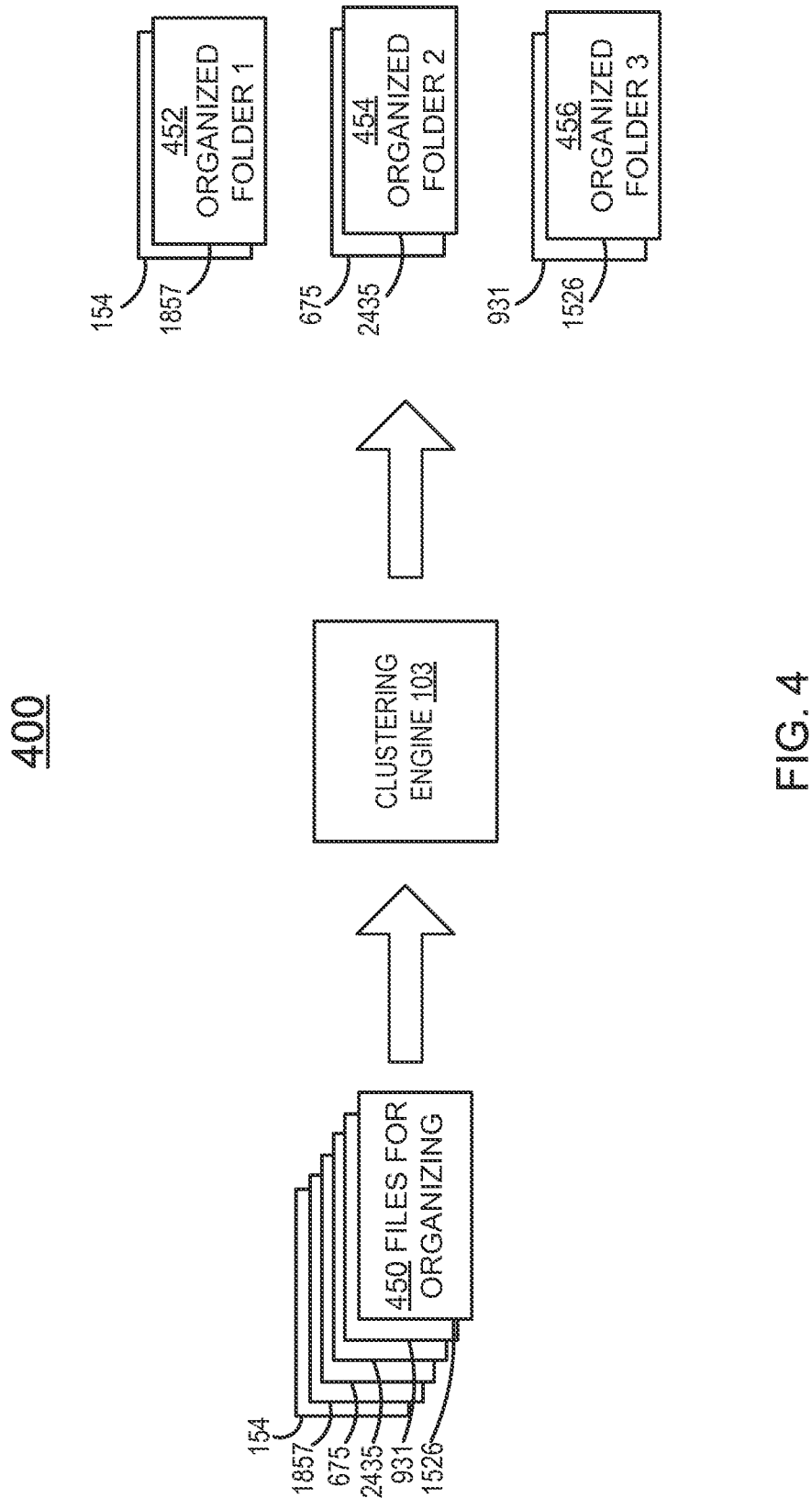
FIG. 4 is a block diagram of a clustering engine performing a clustering of files for organizing into various organized folders on the web-based storage system, according to an illustrative embodiment.

FIG. 4 is a block diagram of a clustering engine 103 performing a clustering of files for organizing into various organized folders on the web-based storage system, according to an illustrative embodiment. After the similarity scores are assessed, the clustering engine 103 may group the files into multiple groups by applying one or more thresholds to the similarity scores that are shown in FIG. 3. In an example, a threshold of 0.7 may be applied to the similarity scores. Files that have similarity scores that exceed the threshold may be grouped together in the same folder. In the example shown in the data structure 300, the files 154 and 1857 have the highest similarity score of 0.9, and are thus recommended by the clustering engine 103 to be stored in the same organized folder 452. Moreover, the files 931 and 1526 have the second highest similarity score of 0.8, and are thus recommended by the clustering engine 103 to be stored in the same organized folder 456.

The clustering engine 103 may be configured to apply a set of rules to sort the remaining files that do not have similarity scores with any other file that exceed the threshold. In particular, additional thresholds may be set to apply to the remaining files. For example, a lower threshold, such as 0.3 may be applied to the remaining files. The files 675 and 2435 may be tentatively recommended by the clustering engine 103 to be stored in the same organized folder 454. The tentative recommendation may be indicated by using a graphical indicia on the display of the local storage device 104, so that the user may be able to distinguish confident suggestions from less confident suggestions. In an example, the more confident suggestions may be highlighted with a different color than the less confident suggestions, or a confidence score may be provided for each recommendation.

As shown in the data structure 300, only six files are selected to be organized. However, any number of files may be selected to be downloaded. Moreover, only six metadata features are shown in the data structure 200 of FIG. 2, but in general, one of ordinary skill in the art will understand that any number of features may be used, and other features may be used in addition to or in replacing the features shown in the data structure 200. In an example, the content of a file, such as the title, filename, keywords, or header content may be one or more metadata features that are considered in the predictive model. In another example, data regarding the changes made to the file, such as the time of the modification and/or the identity of the user who made the modification may be used as metadata features in the predictive model.

In some embodiments, the metadata features that are considered by the predictive model are automatically determined, such as by the clustering engine 103. Alternatively, the local storage device 104 may be configured to prompt a user to select which features should be considered in the predictive model. Similarly, the local storage device 104 may be configured to allow a user to overwrite the output of the clustering engine 103 to change the grouping of certain files, such as by selecting a set of files to store together in the same folder, regardless of its score.

Figure 5:
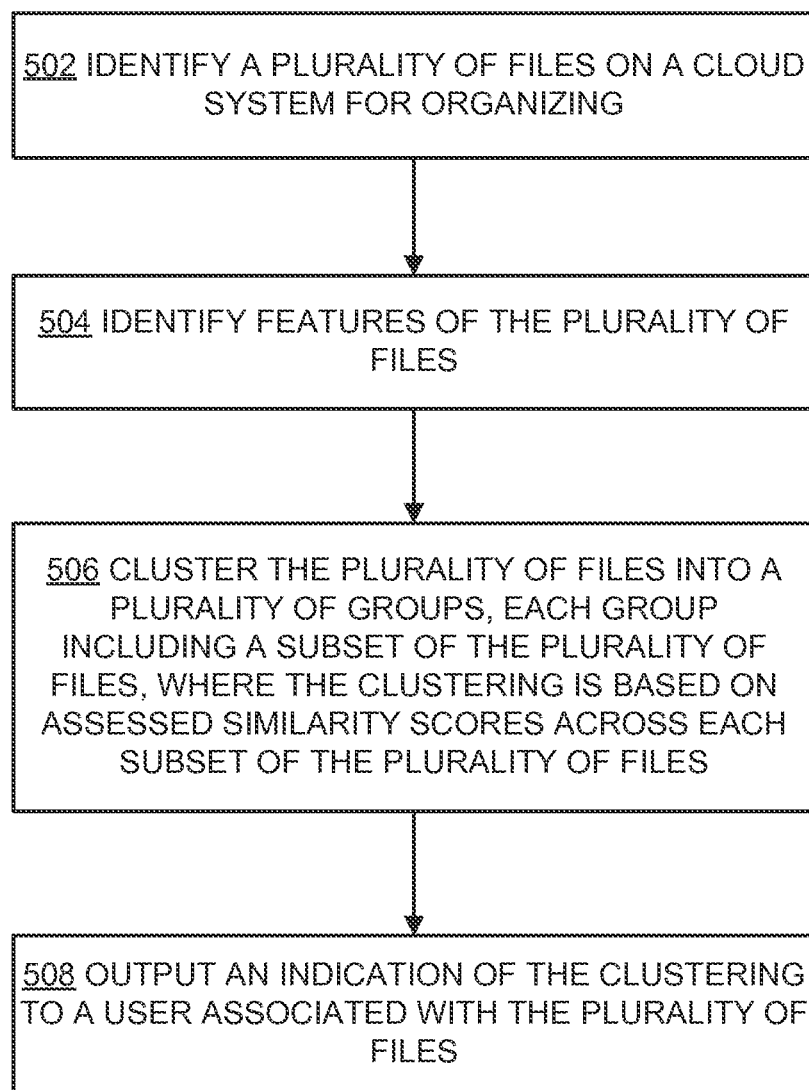
FIG. 5 is a flow chart of an illustrative method for organizing a set of files on a cloud system, according to an illustrative embodiment.

FIG. 5 is a flow chart of an illustrative method 500 for organizing a set of files on a cloud file system, such as the web-based storage system 110, according to an illustrative embodiment. The method 500 may be executed by an engine such as the clustering engine 103, and includes the steps of identifying a plurality of files on a cloud system for organizing (step 502), identifying features of the plurality of files (step 504), clustering the plurality of files into a plurality of groups, where each group includes a subset of the plurality of files, and the clustering is based on assessed similarity scores across each subset of the plurality of files (step 506), and outputting an indication of the clustering to a user associated with the plurality of files (step 508).

At 502, the clustering engine 103 identifies a plurality of files that are stored on a cloud system for organizing. The plurality of files may be a set of files that are specified by the user over a user interface, and may correspond to all the files that are associated with the user and stored on the cloud system, or a subset of the files that are associated with the user and stored on the cloud system. Alternatively, the clustering engine 103 may automatically identify the plurality of files as a set of files that are unorganized, without any input from the user. In an example, the plurality of files may correspond to a set of files that are stored on the user's root directory of the cloud system. The clustering engine 103 may automatically detect when the set of files in the root directory exceeds some threshold number of files or a threshold aggregate size. Such a threshold may be set to trigger the clustering engine 103 to automatically provide a suggestion for how to organize the files.

At 504, the clustering engine 103 identifies features of the plurality of files that were identified at 502. Example features are shown and described in detail in relation to FIG. 2. In particular, the features may include metadata regarding a file, such as a size of the file, a type of the file, an origin of the file, and an owner of the file. When the file is an attachment to an email, the metadata features may further include information regarding the email, such as the sender of the email or the email content. When the file is already stored on the web-based storage system 110, the metadata features may further include an indication of whether the file is already shared with one or more other users, and the user identifiers associated with the other users. Moreover, identifying the features of the plurality of files at 504 may further include identifying relative weights for applying to the features and assessing similarity scores.

At 506, the clustering engine 103 clusters the plurality of files into a plurality of groups. Each group includes a subset of the plurality of files, and the clustering is based on assessed similarity scores across each subset of the plurality of files. In particular, the clustering engine 103 evaluates a respective similarity score for each pair of files in the plurality of files by applying a predictive model to metadata associated with the plurality of files. In an example, the metadata shown in the data structure 200 may be provided to the clustering engine 103, which assigns a score to each pair of files based on the metadata. In particular, the predictive model may correspond to a set of rules that define whether one combination of metadata features would cause a pair of files to be grouped together. Example similarity scores are shown in the data structure 300 of FIG. 3. As was described above, the similarity score for a pair of files may correspond to a predicted likelihood that the user will wish to group the files together in the same folder.

At 508, the clustering engine 103 outputs an indication of the clustering at 506 to a user who is associated with the plurality of files identified at 502. For example, as described in relation to FIGS. 3 and 4, the files that have higher similarity scores are those that are grouped together, and files with lower similarity scores are not grouped together.

Figure 6:
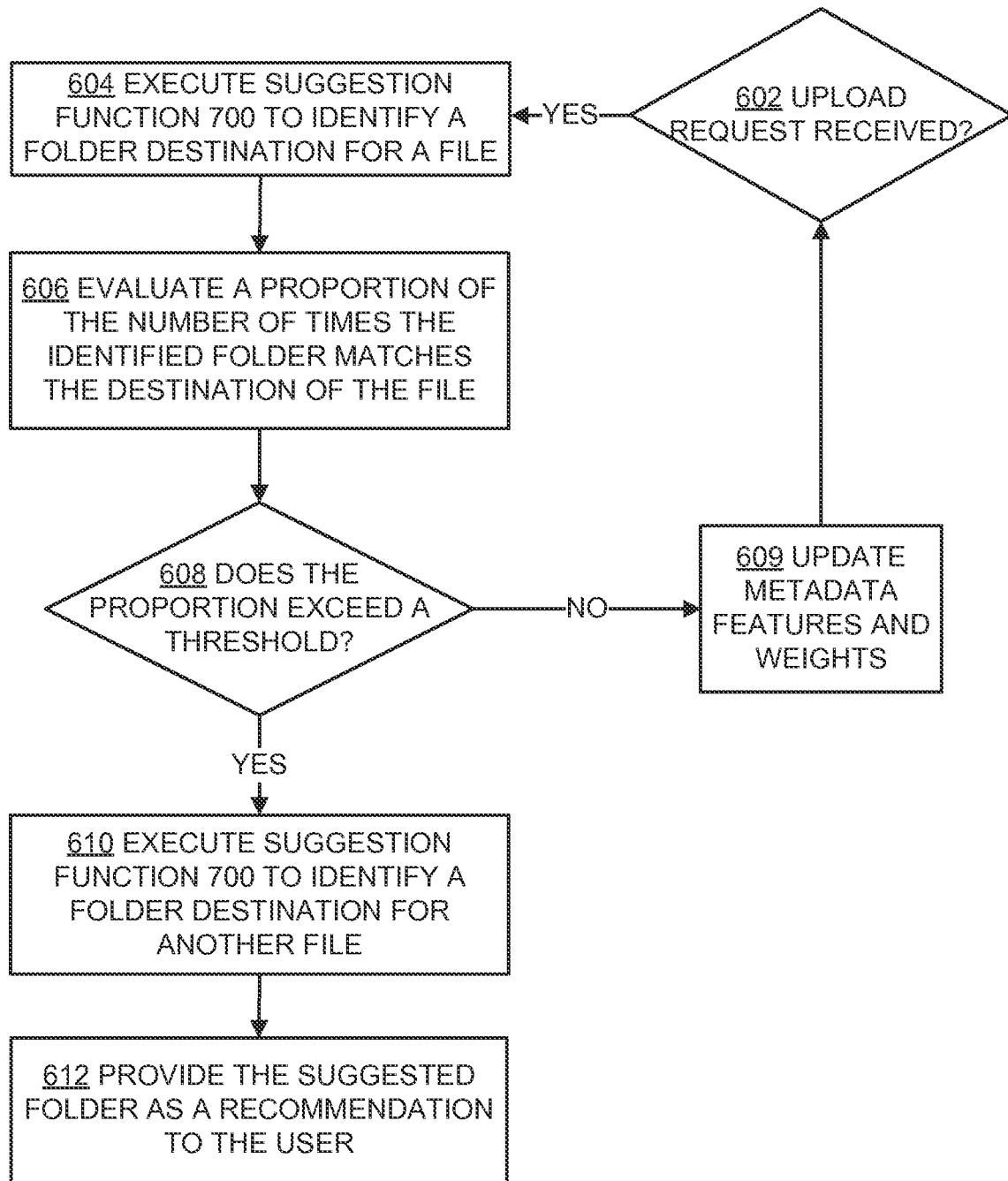
FIG. 6 is a flow chart of an illustrative method for recommending a folder for filing a file requested to be saved to a cloud system, according to an illustrative embodiment.

FIG. 6 is a flow chart of an illustrative method 600 for training a clustering engine and recommending a folder for filing a file requested to be saved to a cloud system, according to an illustrative embodiment. The method 600 may be executed by the clustering engine 103, and includes the steps of determining whether an upload request is received (decision block 602), executing a suggestion function to identify a folder destination for a file (step 604), evaluating a proportion of the number of times the suggested folder matches the destination of the file (step 606), and determining whether the number exceeds a threshold (decision block 608). If not, the method 600 proceeds to update the metadata features and weights (step 609). Otherwise, the method 600 further includes the steps of executing the suggestion function to identify a folder destination for another file (step 610), and providing the suggested folder as a recommendation to the user (step 612).

At decision block 602, the clustering engine 103 determines whether an upload request is received. In an example, the upload request may correspond to the user providing an input indicative of a request to upload a file from the local storage device 104 to the web-based storage system 110. In another example, the upload request may correspond to the user receiving an email with an attachment, and the user providing an input indicative of a request to store the email's attachment on the web-based storage system 110. Alternatively, the clustering engine 103 may automatically detect the receipt of an email with an attachment as a request to upload the attachment to the web-based storage system 110.

At step 604, the clustering engine 103 executes a suggestion function to identify a folder destination for the file in the upload request referred to at 602. In an example, the suggestion function may correspond to the method 700 described in relation to FIG. 7. The clustering engine 103 executes the suggestion function at step 604 in the background, without providing any recommendation to the user. The purpose of executing the suggestion function in the background is to train the predictive model so that the various metadata features and weights applied to the metadata features may be updated to improve the accuracy of the predictive model. That is, before recommendations are provided by the clustering engine 103, it is desirable to ensure that the predictions have sufficient accuracy.

At step 606, the clustering engine 103 evaluates a proportion of the number of times the identified folder matches the actual destination of the file, and at decision block 608, the clustering engine 103 determines whether the proportion exceeds a threshold. In one example, a single file is identified at 602 for uploading. In this case, the proportion of the number of times the identified folder matches the destination of the file is zero or one. In another example, multiple files are identified at 602 for uploading. In this case, the clustering engine 103 may track where the user stores each of the multiple files. If there are few matches, or if the proportion is below some threshold, then the method 600 proceeds to step 609 to update the metadata features and/or the relative weights that are applied to the metadata features. In some embodiments, only the metadata features are updated. Alternatively, the metadata features remain the same, while only the weights are updated, or both the metadata features and weights are updated. After the predictive model is updated at step 609, the method 600 returns to decision block 602 to wait until another upload request is received. The steps 602, 604, 606, 608, and 609 are repeated in a loop until the proportion evaluated at step 606 exceeds some threshold, indicating that the predictive model has some accuracy in predicting folder destinations for a user to store certain files.

The clustering engine 103 may perform a machine learning technique to train the predictive model. To run the machine learning technique, the clustering engine 103 receives two inputs: an input vector (i.e., the metadata of various files) and an answer vector (i.e., the folder destinations of the various files). The clustering engine 103 applies statistical modeling methods to fit a predictive model that is used to predict the folder destinations of the files from the metadata. The predictive model includes the set of rules that define how certain features of a file, such as its metadata, are predicted to affect the folder destination of that file as selected by the user. The predicted folder destinations (as predicted by the predictive model) are compared to the actual folder destinations (i.e., the answer vector). If the predicted destinations mostly match the actual destinations, the predictive model has performed well. However, if there are substantial differences between the predicted destinations and the actual destinations, one or more parameters of the predictive model may be updated, and the updated predicted destinations may be compared to the actual destinations. This process may be repeated until the performance of the predictive model satisfies one or more criteria. After it is determined that the one or more criteria are satisfied, the predictive model corresponds to a scheme that organizes files.

At step 610, the clustering engine 103 executes the suggestion function to identify a folder destination for another file in another upload request, and at step 612, the clustering engine 103 provides the suggested folder as a recommendation to the user. In particular, once the predictive model has achieved some threshold amount of accuracy, the clustering engine 103 may be able to provide better predictions and begin providing suggested folder destinations as recommendations to the user. Moreover, the clustering engine 103 may anticipate that the user will wish to upload certain email attachments to the web-based storage system 110. In this case, upon detecting that an email with an attachment has been received and even before the user indicates a request to upload such attachments, the clustering engine 103 may provide a suggestion to the user for a folder destination to store the attachment. In an example, an attachment to an email may include a receipt for an online purchase. The clustering engine 103 may maintain a folder on the web-based storage system 110 associated with the user for storing receipts. Upon detecting that a receipt has been received, the clustering engine 103 may provide a suggestion to the user to store the receipt from the email into the receipts folder.

Moreover, the clustering engine 103 may detect when certain folders on the web-based storage system 110 are disorganized. For example, a folder may be categorized as disorganized if the average similarity score between each pair of files within the folder is below some threshold, or if the folder includes a threshold number of pairs of files that have similarity scores below some threshold. Upon detecting a disorganized folder, the clustering engine 103 may automatically provide a message to the user, where the message refers to the disorganized folder and suggests a way to organize the folder's contents. In some embodiments, the clustering engine 103 may provide to the user a preview of how the organized files would be stored, such that the user may accept or reject the suggested organization.

Figure 7:
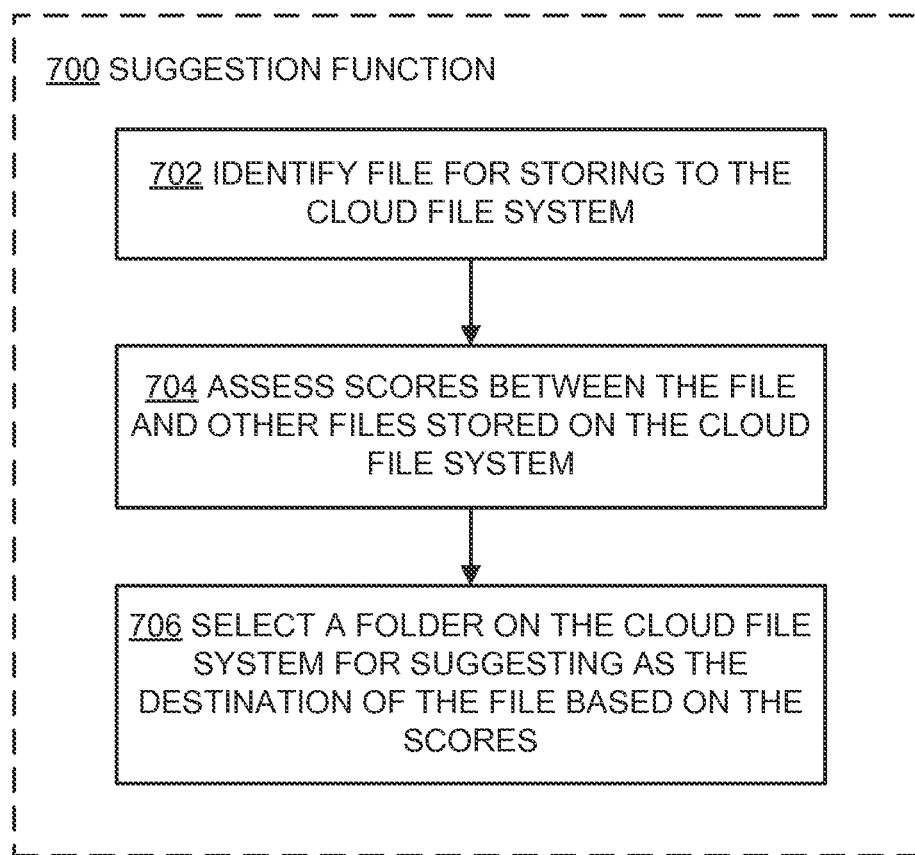
FIG. 7 is a flow chart of an illustrative method for identifying a folder on a cloud system for suggesting as a file destination, according to an illustrative embodiment.

FIG. 7 is a flow chart of an illustrative method 700 for identifying a folder on a cloud system for suggesting as a file destination, according to an illustrative embodiment. The method 700 may be executed by the clustering engine 103, and includes the steps of identifying a file for storing to the cloud file system (step 702), assessing scores between the file and other files stored on the cloud file system (step 704), and selecting a folder on the cloud file system for suggesting as the destination of the file based on the scores (step 706).

At step 702, the clustering engine 103 identifies a file for storing to the cloud file system. In an example, the file is part of an upload request from the local storage device 104 or from the email client 102. In particular, the file may correspond to a local file stored on the local storage device 104 that the user wishes to upload to the web-based storage system 110, or the file may correspond to an attachment in an email received via the email client 102. In some embodiments, the clustering engine 103 identifies a set of files at step 702 for organizing or suggesting folder destinations.

At step 704, the clustering engine 103 assesses scores between the file identified at step 702 and other files that are stored and organized on the cloud file system. In particular, the clustering engine 103 evaluates a respective similarity score for each pair of files by applying a predictive model to metadata associated with the files. In an example, the metadata shown in the data structure 200 may be provided to the clustering engine 103, which uses the metadata to assign the similarity score. In particular, the predictive model may correspond to a set of rules that define whether one combination of metadata features would cause a pair of files to be grouped together. Example similarity scores are shown in the data structure 300 of FIG. 3. The similarity score for a pair of files may correspond to a predicted likelihood that the user will wish to group the files together in the same folder.

At step 706, the clustering engine 103 selects a folder on the cloud file system for suggesting as the destination of the file based on the assessed scores. In particular, a set of candidate folders that are on the web-based storage system 110 may be assessed based on the files that are in each folder. For example, similarity scores may be assessed for each pairing between the file identified at step 702 and each file in a candidate folder. An aggregate similarity score may be assessed for the candidate folder, where the aggregate similarity score may correspond to the mean, median, or any other suitable statistic of the similarity scores for each file in the corresponding folder. The candidate folder with the aggregate similarity score that satisfies some criteria may be selected as the suggested destination for the file. In an example, the criteria may include selecting the folder with the highest aggregate similarity score or with an aggregate similarity score that exceeds some threshold.

In another example, the criteria may include setting one or more other constraints, such as ensuring that the selected folder does not include a file that has a very low similarity score with the identified file. In some embodiments, when none of the criteria are satisfied, the clustering engine 103 may suggest creating a new folder or sub folder for storing the identified file. In some embodiments, when a set of files are identified at step 702 for organizing into folders, the clustering engine 103 may suggest creating a new sub folder in an existing or a new folder. In particular, the clustering engine 103 may determine that a subset of files in a group have significantly higher similarity scores with one another than the remaining subset of files within the group. In this case, the clustering engine 103 may suggest creating a new sub folder for storing the subset of files with the higher similarity scores.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A computer-implemented method comprising:
identifying, by a server associated with a cloud file system, a file of a user to be stored on the cloud file system, wherein the cloud file system stores a plurality of files;
identifying, by the server, features of the file, wherein the features of the file include at least three selected from a group comprising file content, keywords in the file, file name, time of creation of the file, time of modification of the file, type of the file, a set of users associated with the file, folder depth of the file, and an origination of the file;
identifying, by the server, a plurality of folders that are associated with a user account of the user on the cloud file system, each of the plurality of folders including a subset of the plurality of files, wherein grouping the plurality of files into respective folders is based on one or more outputs of a machine learning model, wherein the one or more outputs of the machine learning model indicate a plurality of predicted user selections of folders for the plurality of files;
determining, for the file, one or more folders of the plurality of folders associated with the user account of the user on the cloud file system based on the features of the file and features of the plurality of files;
determining, by the server and based on the one or more folders associated with the user account of the user on the cloud file system, whether any of the one or more folders associated with the user account of the user on the cloud file system satisfies one or more destination folder criteria; and
upon determining that none of the one or more folders associated with the user account of the user on the cloud file system satisfies the one or more destination folder criteria, causing, by the server, a new folder associated with the user account of the user to be created on the cloud file system as a destination folder for the file of the user.

2. The method of claim 1, wherein at least one of the plurality of files is an attachment file corresponding to an email attachment of an email message.

3. The method of claim 2, wherein a predicted destination folder for the attachment file comprises one or more files that each have a similarly score with the attachment file that is above a threshold.

4. The method of claim 2, wherein the features further include at least two selected from the group comprising: a sender of the email message, one or more recipients of the email message, content of the email message, an indication of whether the email message is personal, an indication of whether the email message is business, a number of attachment files in the email message, or one or more folder destinations on the cloud file system of one or more other attachment files in the email message.

5. The method of claim 1, wherein the grouping of the plurality of files into the respective folders is performed upon determining that a number of files in the plurality of files exceeds a threshold and that the plurality of files are in a same folder on the cloud file system.

6. The method of claim 1, wherein causing the new folder to be created as the destination folder for the file to be stored on the cloud file system comprises:
providing a recommendation to the user to add the file to the new folder; and
determining whether the user accepts the recommendation.

7. The method of claim 1, wherein the origination of the file indicates whether the file is an attachment to an email message or a file stored on a local file system.

8. The method of claim 1, further comprising:
training the machine learning model on a set of inputs comprising features of additional files and a set of target outputs for the set of inputs, the set of target outputs comprising a set of destination folders to store the additional files, wherein the trained machine learning model is to predict, based on relative weights applied to the features of a file, which subset of features among the features of the file affects a placement of the file into a particular destination folder for a user from a group of users that each have previously stored files in the set of destination folders.

9. The method of claim 8, wherein the determining, for the file, the one or more folders of the plurality of folders associated with the user account of the user on the cloud file system is performed using the trained machine learning model.

10. A server system for a cloud file system, the server system comprising:
a memory; and
a processor, coupled to the memory, to perform operations comprising:
identifying a file of a user to be stored on the cloud file system, wherein the cloud file system stores a plurality of files;
identifying features of the file, wherein the features of the file include at least three selected from a group comprising file content, keywords in the file, file name, time of creation of the file, time of modification of the file, type of the file, a set of users associated with the file, folder depth of the file, and an origination of the file;
identifying a plurality of folders that are associated with a user account of the user on the cloud file system, each of the plurality of folders including a subset of the plurality of files, wherein grouping the plurality of files into respective folders is based on one or more outputs of a machine learning model, wherein the one or more outputs of the machine learning model indicate a plurality of predicted user selections of folders for the plurality of files;
determining, for the file, one or more folders of the plurality of folders associated with the user account of the user on the cloud file system based on the features of the file and features of the plurality of files;
determining, based on the one or more folders associated with the user account of the user on the cloud file system, whether any of the one or more folders associated with the user account of the user on the cloud file system satisfies one or more destination folder criteria; and
upon determining that none of the one or more folders associated with the user account of the user on the cloud file system satisfies the one or more destination folder criteria, causing a new folder associated with the user account of the user to be created on the cloud file system as a destination folder for the file of the user.

11. The system of claim 10, wherein at least one of the plurality of files is an attachment file corresponding to an email attachment of an email message.

12. The system of claim 11, wherein a predicted destination folder for the attachment file comprises one or more files that each have a similarly score with the attachment file that is above a threshold.

13. The system of claim 11, wherein the features further include at least two selected from the group comprising: a sender of the email message, one or more recipients of the email message, content of the email message, an indication of whether the email message is personal, an indication of whether the email message is business, a number of attachment files in the email message, or one or more folder destinations on the cloud file system of one or more other attachment files in the email message.

14. The system of claim 10, wherein the grouping of the plurality of files into the respective folders is performed upon determining that a number of files in the plurality of files exceeds a threshold and that the plurality of files are in a same folder on the cloud file system.

15. The system of claim 10, wherein causing the new folder to be created as the destination folder for the file to be stored on the cloud file system comprises:
providing a recommendation to the user to add the file to the new folder; and
determining whether the user accepts the recommendation.

16. The system of claim 10, wherein the operations further comprise:
training the machine learning model on a set of inputs comprising features of additional files and a set of target outputs for the set of inputs, the set of target outputs comprising a set of destination folders to store the additional files, wherein the trained machine learning model is to predict, based on relative weights applied to the features of a file, which subset of features among the features of the file affects a placement of the file into a particular destination folder for a user from a group of users that each have previously stored files in the set of destination folders.

17. The system of claim 10, wherein the determining, for the file, the one or more folders of the plurality of folders associated with the user account of the user on the cloud file system is performed using the trained machine learning model.

18. A non-transitory computer-readable medium comprising instructions, which when executed by a processor of a server associated with a cloud file system, cause the processor to perform operations comprising:

identifying a file of a user to be stored on the cloud file system, wherein the cloud file system stores a plurality of files;

identifying features of the file, wherein the features of the file include at least three selected from a group comprising file content, keywords in the file, file name, time of creation of the file, time of modification of the file, type of the file, a set of users associated with the file, folder depth of the file, and an origination of the file;

identifying a plurality of folders that are associated with a user account of the user on the cloud file system, each of the plurality of folders including a subset of the plurality of files, wherein grouping the plurality of files into respective folders is based on one or more outputs of a machine learning model, wherein the one or more outputs of the machine learning model indicate a plurality of predicted user selections of folders for the plurality of files;

determining, for the file, one or more folders of the plurality of folders associated with the user account of the user on the cloud file system based on the features of the file and features of the plurality of files;

determining, based on the one or more folders associated with the user account of the user on the cloud file system, whether any of the one or more folders associated with the user account of the user on the cloud file system satisfies one or more destination folder criteria; and upon determining that none of the one or more folders associated with the user account of the user on the cloud file system satisfies the one or more destination folder criteria, causing a new folder associated with the user account of the user to be created on the cloud file system as a destination folder for the file of the user.

* * * * *